(12) United States Patent
Grant

(10) Patent No.: US 7,284,781 B2
(45) Date of Patent: Oct. 23, 2007

(54) TAILGATE RAMP AND METHOD FOR PROVIDING ACCESS TO A VEHICLE

(75) Inventor: David Grant, Royal Oak, MI (US)

(73) Assignee: Nissan Technical Center North America, Inc., Farmington Hills, MI (US)

(*) Notice: Subject to any disclaimer, the term of this patent is extended or adjusted under 35 U.S.C. 154(b) by 18 days.

(21) Appl. No.: 11/339,737

(22) Filed: Jan. 25, 2006

(65) Prior Publication Data
US 2007/0170741 A1    Jul. 26, 2007

(51) Int. Cl.
*B62D 33/033* (2006.01)

(52) U.S. Cl. .......................... 296/61; 296/57.1; 296/59

(58) Field of Classification Search ................. 296/50, 296/51, 57.1, 61, 62; 14/69.5; 414/430, 414/480, 537
See application file for complete search history.

(56) References Cited

U.S. PATENT DOCUMENTS

| | | | |
|---|---|---|---|
| 3,510,015 A * | 5/1970 | Roshaven | 414/537 |
| 4,003,483 A * | 1/1977 | Fulton | 414/537 |
| 4,668,002 A * | 5/1987 | Hanson | 296/61 |
| 5,211,437 A * | 5/1993 | Gerulf | 296/61 |
| 5,244,335 A | 9/1993 | Johns | |
| 5,425,564 A * | 6/1995 | Thayer | 296/61 |
| 5,597,195 A | 1/1997 | Meek | |
| 5,971,465 A * | 10/1999 | Ives et al. | 296/61 |
| 6,672,642 B1 * | 1/2004 | Seksaria et al. | 296/50 |
| 6,701,563 B2 * | 3/2004 | Schomaker et al. | 14/69.5 |
| 6,749,246 B2 * | 6/2004 | Landwehr | 296/61 |
| 6,868,574 B2 * | 3/2005 | Schomaker et al. | 14/69.5 |
| 2004/0160079 A1 | 8/2004 | Harper et al. | |

* cited by examiner

*Primary Examiner*—D. Glenn Dayoan
*Assistant Examiner*—Greg Blankenship
(74) *Attorney, Agent, or Firm*—Young Basile Hanlon MacFarlane & Helmholdt P.C.

(57) ABSTRACT

A tailgate for a pickup truck or other vehicle. The tailgate is convertible to a loading ramp to facilitate access to the cargo-holding area of the vehicle. The tailgate includes at least one extensible hook member on one side edge of the tailgate and a panel extensible from the other side edge of the tailgate. In use, the tailgate is removed from the truck, the hook member is extended, the panel is extended, and the hook member is engaged with a rear edge of the cargo-holding area with the tailgate and extended panel extending rearwardly to define the ramp.

18 Claims, 3 Drawing Sheets

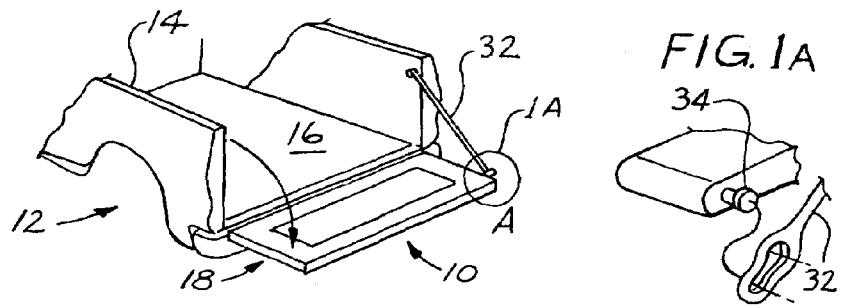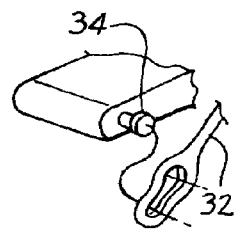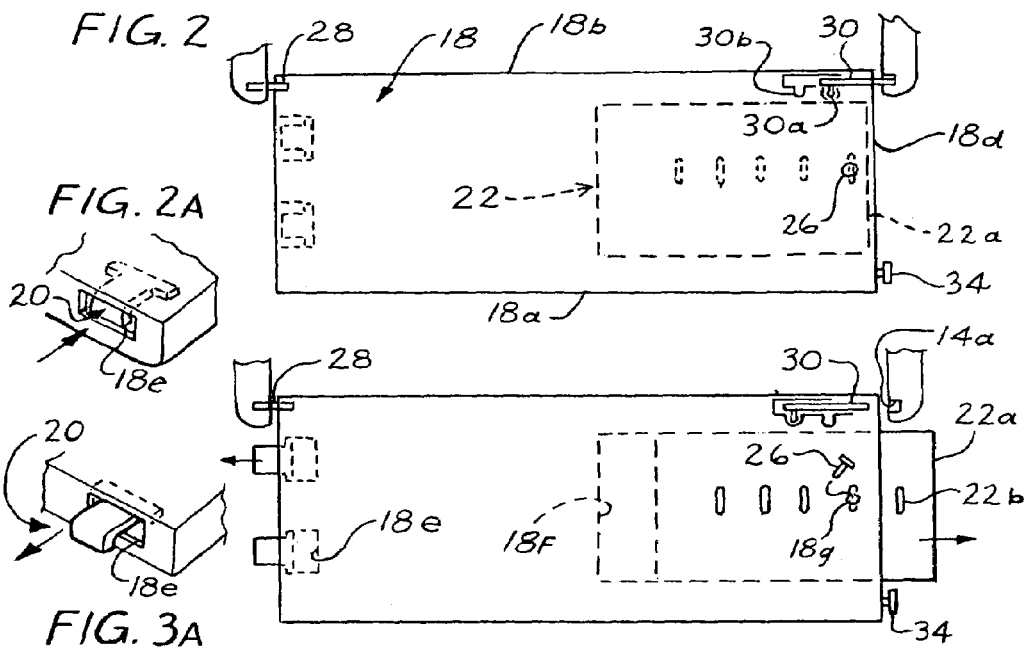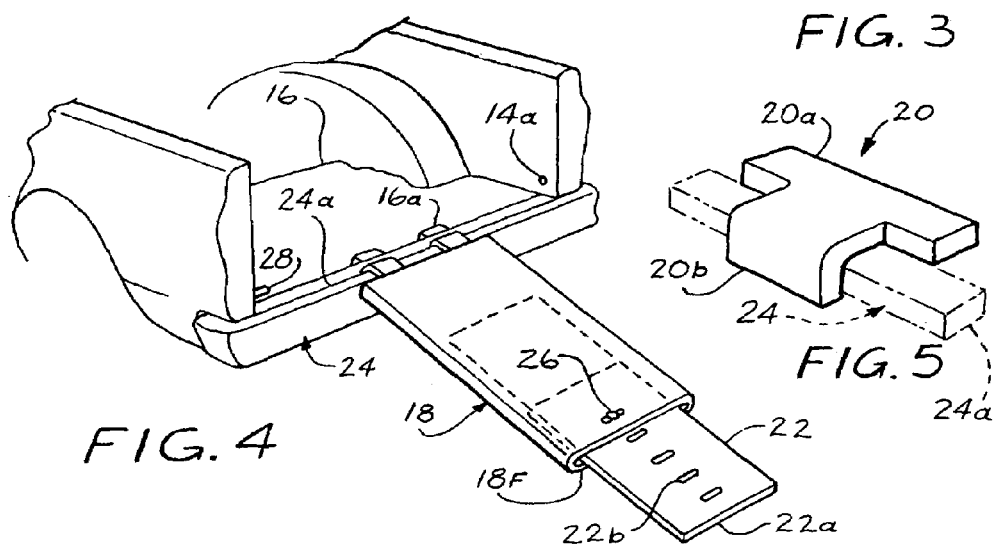

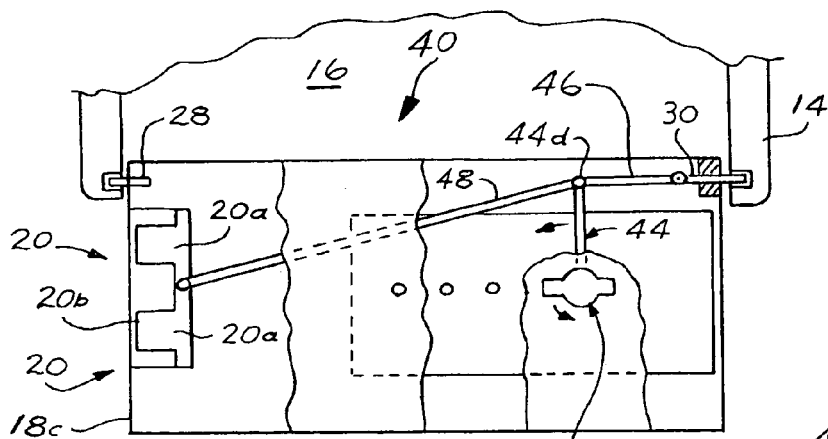
FIG. 6
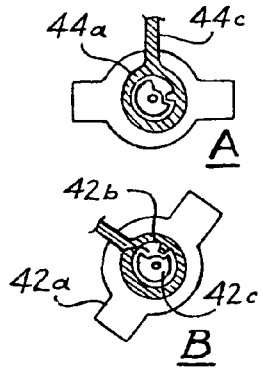
FIG. 12
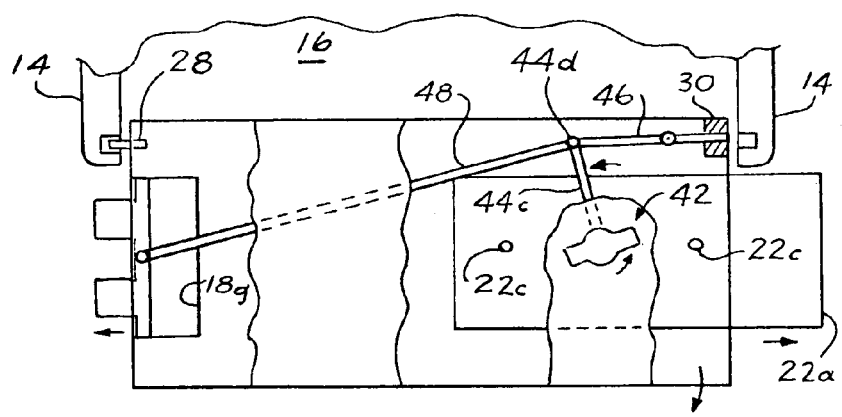
FIG. 7
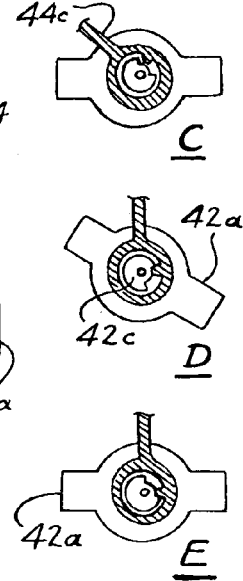
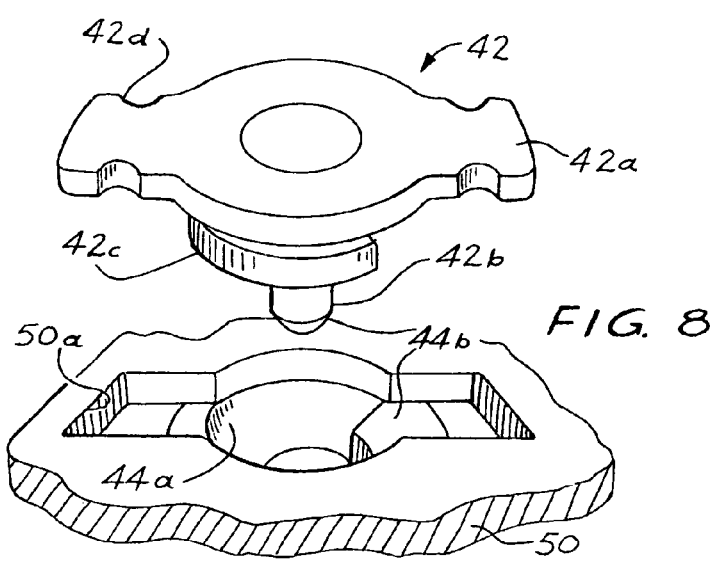
FIG. 8

TAILGATE RAMP AND METHOD FOR PROVIDING ACCESS TO A VEHICLE

FIELD OF THE INVENTION

This invention relates to tailgates vehicle and more particularly to tailgates that can be used as ramps.

BACKGROUND

Pickup trucks and other vehicles often have pivotally mounted access doors or gates (hereinafter "tailgates") to permit access to the vehicle's cargo bed or other cargo-holding area. These tailgates are typically mounted for pivotal movement between a raised position closing the entrance to the cargo bed or other cargo-holding area of the vehicle and a lowered position extending rearwardly from the cargo-holding area to provide a rearward extension of the cargo-holding area surface. In either position, loading cargo onto the bed of the vehicle is difficult since the loading requires, in the case of the raised tailgate, lifting the cargo over the tailgate and, in the case of the lowered tailgate, lifting the cargo onto the tailgate and then sliding the cargo onto the cargo-holding area. It would be desirable to provide a more convenient and cost effective means of loading cargo into the cargo-holding area of a vehicle with a tailgate.

SUMMARY

In accordance with one aspect of the invention, a tailgate is provided for a vehicle having a cargo-holding area. The tailgate includes a tailgate body adapted for removable mounting to the vehicle, and at least one coupling member proximate to a first side edge of the tailgate body. The coupling member is configured to engage the cargo-holding area with the tailgate body extending from the cargo-holding area to define a downwardly sloping ramp.

In accordance with another aspect of the invention, a method is provided for allowing access to a cargo-holding area of a vehicle equipped with a tailgate. The method includes removing the tailgate from the vehicle and mounting the first side edge of the tailgate to the cargo-holding area, with the tailgate extending from the cargo-holding area to define a downwardly sloping ramp.

BRIEF DESCRIPTION OF THE DRAWINGS

The description herein makes reference to the accompanying drawings wherein like reference numerals refer to like parts throughout the several views, and wherein:

FIG. 1 is a fragmentary perspective view of a vehicle including a first embodiment of a tailgate as disclosed herein;

FIG. 1A is a fragmentary view taken within the circle 1A of FIG. 1;

FIG. 2 is a fragmentary view showing an embodiment of the tailgate as disclosed herein in a lowered position;

FIG. 2A is a detail view of the tailgate of FIG. 2;

FIG. 3 is a fragmentary view showing the tailgate of FIG. 2 in a lowered position with hook members and a panel member extended from the main body of the tailgate;

FIG. 3A is a detail view of the tailgate of FIG. 3;

FIG. 4 is a perspective view showing the tailgate disclosed herein utilized as a ramp;

FIG. 5 is a detail view of one of the hook members;

FIG. 6 is a fragmentary view showing a second embodiment of the invention tailgate;

FIG. 7 is a fragmentary top view of a second embodiment of the tailgate as disclosed herein with hook members and a panel member show in an extended position;

FIG. 8 is a fragmentary perspective view showing a handle assembly utilized in the second embodiment;

FIGS. 12A through 12E are sequential views showing the operation of the handle assembly.

DETAILED DESCRIPTION

Figure 9:
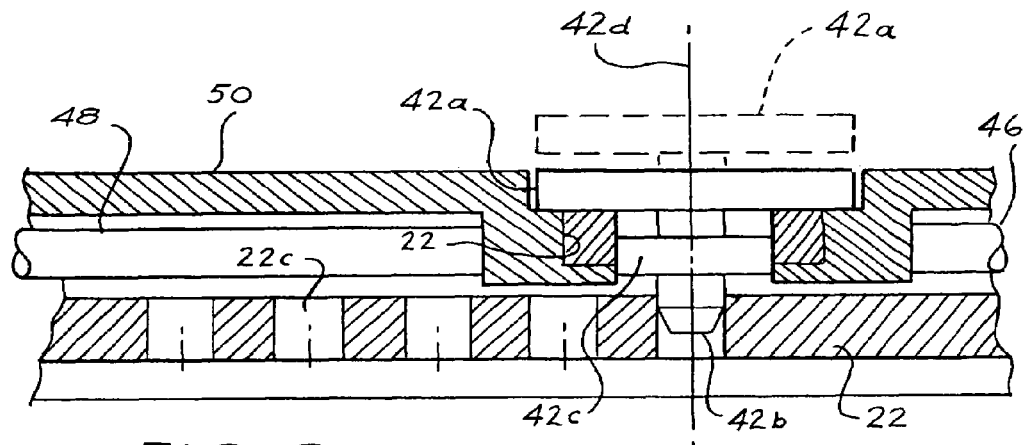
FIG. 9 is a detail cross sectional view of the handle assembly and surrounding tailgate taken along the 9-9 line of FIG. 6.
Figure 10:
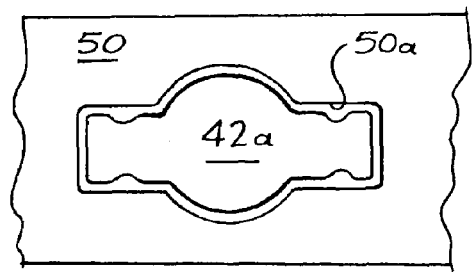
FIG. 10 is a top view of handle assembly in the tailgate of FIG. 6.

Disclosed herein is a tailgate for use with a vehicle having a cargo-holding area and a method for providing access to the cargo-holding area of a vehicle. In the method disclosed herein, the tailgate is removed from the truck and one side edge of the tailgate is mounted to a rear edge of the cargo-holding area with the tailgate extending downward therefrom to define a ramp.

The tailgate disclosed herein includes at least one retractable hook member positioned in one side edge of the tailgate. The hook member is movable to an extended position prior to mounting the hook member and associated one side edge of the tailgate to the rear edge of the cargo-holding area. Where desired or required, the tailgate may include a retractable panel extensible from the opposed side edge of the tailgate. The panel is movable to an extended position to adjust the length of the ramp formed by the removed tailgate. The tailgate as disclosed herein may include a handle assembly. The handle assembly can include a handle member and at least one linkage connected to handle member and at least one of the hook member or the panel. The linkage is operative in response to movement of the handle member to release the panel for extensible movement and/or to move the hook member to an extended position.

A first embodiment of tailgate 10 as disclosed herein is seen in FIG. 1 forming a part of a fragmentarily shown vehicle 12. The vehicle 12 includes sidewalls 14 and a cargo-holding area 16. The tailgate 10 as depicted is mounted for pivotal movement between a raised position closing or at least obstructing access to the cargo-holding area 16 and a lowered position in which the tailgate extends rearwardly from the cargo-holding area 16 to form a rearward extension of the cargo-holding area surface.

As depicted in FIGS. 2 and 3, tailgate 10, broadly considered, includes a main body 18 as well as at least one extensible hook member 20, and an extensible panel 22, both received in main body 18 and movably extensible therefrom. Main body 18 has a generally rectangular configuration and defines an upper edge 18a, a lower edge 18b, a left side edge 18c, and a right side edge 18d. The tailgate as depicted in FIG. 1 has two hook members 20 which engage the rear edge of cargo-holding area 18. The tailgate as disclosed herein contemplates the use of a single elongated hook member as well as multiple individual hooks as desired or required. It is also contemplated that one or more hook members can be joined together to retract and extend together.

As depicted, hook member(s) 20 act as a coupling mechanism, and are positioned in laterally spaced relation in left side edge 18c and are moveable between the retracted position within the main body 18 seen in FIG. 2 and FIG. 2A, in which hook member(s) 20 do not engage with cargo-holding area 18, and the extended position seen in FIG. 3 and FIG. 3A, in which hook member(s) 20 can engage with cargo-holding area 18. It will be understood that suitable guide channels 18e can be defined in the main body 18 to facilitate the movement of the hook member(s) 20 between their retracted and extended positions. Each hook member, as best seen in FIG. 5, includes a guide portion 20a guiding in the respective channel 18e and a hook portion 20b configured to be positioned over the upper edge 24a of a rear bumper 24 when the hook member(s) 20 are in their extended position. Alternatively, the hook portions 20b may be engaged in slots 16a provided at the rear edge of the cargo-holding area 16. It will be understood that suitable detent structures can be provided in the main body 18 and on the hook member(s) 20 to positively define and delimit the retracted and extended positions of the hook member(s). In place of hook member(s) 20, other coupling mechanisms, such as latches, may be used.

Extensible panel 22 can have a generally rectangular configuration and is slidably mounted in a suitable guide channel 18f defined within main body 18. Extensible panel 22 is movable between a retracted position, seen in FIG. 2, in which the right trailing edge 22a of the panel is positioned generally flush with right leading edge 18d of main body 18 and an extended position, seen in FIGS. 3 and 4, in which the right leading edge 22a is positioned outward of main body edge 18d. It is contemplated that the tailgate 10 can include a suitable fastening device to secure movement of extensible panel 22 during operation and/or storage. As specifically depicted in the drawing FIGS. 3, 4, and 5, the extent of outward sliding movement of panel 22 relative to main body 18 is defined by the engagement of a pin 26 passing through an aperture 18g in main body 18 for engagement in one of a sequential plurality of slots 22b defined in the panel 22. The panel is seen in FIG. 3 extended only slightly from the leading right edge 18d of the main body 18 and is seen in FIG. 4 extended substantially from the leading right edge 18d of the main body.

During normal vehicle operation, the tailgate 10 is mounted for pivotal movement between raised and lowered positions by a mounting mechanism, which in this case has a left pivot pin 28 and a right pivot pin 30. As depicted in drawing FIGS. 2 and 3, the left pivot pin 28 is carried by a side wall 14 and is received in a socket defined in edge 18c of the tailgate 10. The right pivot pin 30 is retractable and is received in a socket 14a defined in the opposite side wall 14. By retracting right pivot pin 30, tailgate 10 can be released from its mounting and removed from vehicle 12. As depicted, right pivot pin 30 is retractably positioned in channel 30c. Pivot pin 30 is comprised of a body and pivot pin handle member 30a extending therefrom. Pivot pin handle member 30a coacts with detents 30b in channel 30c to maintain the pivot pin in either the retracted or extended position. The lowered position of the tailgate can be defined by a cable 32 supported at one end on a side wall 14 of the vehicle 12 and coacting at its other, lower end with a pin 34 on the tailgate 10 (as best seen in FIG. 1A).

In using the tailgate 10 depicted in FIGS. 1-5, the tailgate 10 is lowered to its lowered position seen in FIG. 1. Where use as a ramp is desired, the lower end of cable 32 is disconnected from pin 34. Retractable pivot pin 30 is retracted from the associated sidewall 14 utilizing a pivot pin handle member 30a coacting with detents 30b. Pin 26 is removed and panel 22 is slid outwardly from main body 18 to an extended position relative to the main body 18 Pin 26 is reinserted to engage a selected slot 22b and maintain the panel 22 in its extended position The tailgate 10 is removed from the vehicle 12, rotated 90°, and positioned with the hook portions 20b of the hook members 20 engaging the upper edge 24a of the bumper 24 with the tailgate main body 18 and extended panel 22 extending rearwardly from the truck 12 to define a ramp to facilitate loading of cargo onto the cargo-holding area 16. The length of the ramp and the associated loading angle defined by the cargo ramp are defined by the extent to which the panel 22 is extended from the main body 18 of the tailgate 10. It is contemplated that there may be applications where it will not be necessary to extend the panel 22 from the main body 18 of the tailgate 10. In such situations, allowing instead the right edge 18d of the main body of the tailgate to rest on the support surface. Once the loading or unloading operations are completed, the tailgate can be returned to its normal tailgate position between the sidewalls 14 by reversing the procedure just outlined.

One alternate embodiment is depicted in FIGS. 6-12. The alternate embodiment is generally similar to the embodiment depicted in FIGS. 1-5. The embodiment depicted in FIGS. 6-12 includes a handle assembly 40 is provided to facilitate the conversion of the tailgate to a ramp. As depicted, handle assembly 40 includes a handle 42, an actuator link 44, a pivot pin link 46, and a hook member link 48. Handle 42 of handle assembly 40 includes a handle portion 42a, a pin portion 42b, and an actuator portion 42c.

As particularly depicted in FIG., 8 handle portion 42a is normally received in a recess 50a defined in an inner or upper skin 50 of the tailgate 10. As depicted, recess 50a has a configuration matching the configuration of the handle portion 42a so that rotational movement of the handle portion is precluded when the handle portion is received in the recess. Handle portion 42a may include cutouts 42d to facilitate grasping of the handle portion 42a to lift the handle portion out of the recess 50a.

Pin portion 42b of handle 42 extends centrally downward from handle portion 42a and is sized to be selectively engaged in a successive plurality of apertures 22c provided in panel 22 so as to define and delimit the extent of outward movement of the panel relative to the main body of the tailgate. Actuator portion 42c is positioned between handle portion 42a and pin portion 42b and has a generally circular configuration including an arcuate cut out 42e.

Figure 11:
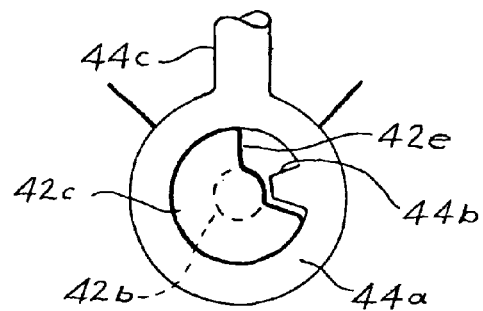
FIG. 11 is a fragmentary detail view of the handle assembly in relationship to the actuator assembly of the tailgate of FIG. 6.

As depicted in FIG. 11, actuator link 44 has an annular pivot end 44a defining an internal finger 44b for selective coaction with handle actuator portion 42c. Annular pivot end 44a includes a main body rod portion 44c extending radially from annular portion 44a to a free end 44d.

As seen in FIGS. 6 and 7, pivot pin link 46 is pivotally secured at one end to the free end 44d of actuator link 44 and is pivotally secured at its other end to pivot pin 30.

Hook member link 48 is pivotally secured at one end to the free end 44d of actuator link 44 and is pivotally secured at its other or free end to hook member(s) 20, which, in this embodiment, are joined together proximate their respective guide portions 20a to facilitate ganged movement of the links within a common guideway 18g provided proximate the left edge 18c of the tailgate.

As depicted in FIGS. 8 and 11, actuator link annular end 44a is journaled in a socket 50 defined in the tailgate in underlying relation to recess 50a. Actuator portion 42c of handle 42 is journaled in annular end 44a. Annular end 44a and actuator portion 42c rotate about the central axis 42d of the handle portion 42.

In the use of the second embodiment of the tailgate 10, the tailgate is moved to the lowered position. Cable 32 is disconnected from the tailgate. Handle 42 is lifted from recess 50a to release pin portion 42b from engagement with the respective aperture 22c in the panel 22. The panel 22 is moved to an extended position relative to the main body 18 of the tailgate 10. Once the panel is in the extended position, the handle portion 42 can be rotated from the position seen in FIG. 12A to the position seen in FIG. 12B. This has the effect of retracting pivot pin 30 and moving the ganged hook member(s) 20 to an extended position relative to tailgate side edge 18c. As the handle is moved to the position seen in FIG. 12C, the handle can be moved downwardly to reassume its position within recess 50a and engage pin portion 42b with an aperture 22c corresponding to the desired extent of extension of the panel 22. The tailgate. 10 can be removed from the body of the vehicle 12, rotated 90°, and installed as a ramp extending rearwardly from the cargo-holding area 16 of the vehicle with the hook portion(s) 20b of the hook members 20 engaging the upper edge 24a of the bumper 24 or, alternatively, received in slots 16a.

To return the tailgate 10 to its tailgate function on the vehicle, handle 42 is raised from recess 50a to release the pin portion 42b from engagement with the aperture 22c thereby permitting movement of panel 22 relative to main body 18. The panel 22 can be returned to its retracted position within the main body 18 of the tailgate 10 and the tailgate lifted to release the hook portion(s) 20b of the hook members from engagement with the upper edge 24a of bumper 24 or alternatively the slots 16a. The tailgate can be rotated through 90° to position the lower edge 18b of the tailgate in alignment with pivot pin 28 and socket 14a. The handle portion 42 can be is turned from the position seen in FIG. 12C to the position seen in FIG. 12D to retract the hook members 20b into the main body 18 of the tailgate 10 and extend pivot pin 30 into socket 14b. The handle 42 can be rotated from the position seen in FIG. 12D to the position seen in FIG. 12E and lowered to its recessed position within recess 50a, The cable 32 can be reinstalled on the pin 34 and regular tailgate operations resumed. It will be understood that the cutout 42e in the actuator portion 42c of the handle allows the handle to be returned to its recessed position within recess 50a after movement of the hook member(s) 20 to their extended position and retraction of the pivot pin 30, as well as after retraction of the hook member(s) 20 and extension of the pivot pin 30.

Where desired or required, various spring devices may be provided to assist the outward movement of the panel 22 or to assist the return movement of the handle 42. It will further be understood that a suitable detent mechanism may be provided to maintain the hook member(s) 20 in the FIGS. 1-5 embodiment in their extended as well as in their retracted positions.

The embodiment will be seen to provide a tailgate for a vehicle which can be converted to a loading ramp for the truck. The tailgate can be esthetically pleasing since the mechanisms utilized in the conversion from tailgate to ramp can be made not visible in the normal usage of the tailgate. The tailgate in use as a ramp allows ready adjustment of the length of the ramp; and a relatively wide loading ramp is provided since substantially the entire width and height of the tailgate can be utilized as a ramp. Although the disclosed embodiment has been illustrated with a pickup truck, the invention can be practiced with other types of vehicles having tailgates, including trucks, cars and sport-utility vehicles.

It is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of providing access to a cargo-holding area of a vehicle which includes a tailgate having an upper edge, a lower edge, a first side edge, and a second side edge opposed to the first side edge, the method comprising:
   removing the tailgate from the vehicle; and
   mounting the first side edge of the tailgate to the cargo-holding area with the tailgate extending rearwardly therefrom to define a downwardly sloping ramp;
   wherein the tailgate includes at least one hook member extendably positioned in the first side edge of the tailgate; and further comprising moving the hook member to an extended position prior to mounting the first side edge to the rear edge of the cargo-holding area.

2. The method of claim 1, wherein the tailgate includes a panel extensible front the second side edge of the tailgate; and further comprising moving the panel to an extended position to adjust the ramp length.

3. A tailgate for a vehicle having a cargo-holding area, comprising:
   a tailgate body adapted for removable mounting to the vehicle;
   at least one coupling member configured to engage the cargo-holding area with the tailgate body extending therefrom to define a downwardly sloping ramp:
   a handle assembly positioned in the tailgate body, the handle assembly comprising a handle member and a linkage connecting the handle member and the coupling member;
   wherein the coupling member is movable between an engagement position and a non-engagement position, and the linkage is operable in response to the movement of the handle member to move the coupling member into the engagement position.

4. The tailgate of claim 3, wherein the coupling member is a hook.

5. The tailgate of claim 4, wherein the hook is retractable.

6. The tailgate of claim 3, wherein the coupling member includes a pair of laterally spaced hooks.

7. The tailgate of claim 3, wherein the tailgate further includes a panel extensible from a second side edge of the tailgate body that is opposite the first side edge.

8. The tailgate of claim 3, further comprising:
   a mounting mechanism on the tailgate body configured to pivotally mount the tailgate body to th vehicle;
   wherein the linkage is operative in response to movement of the handle member to release the mounting mechanism to allow removal of the tailgate body from the vehicle.

9. The tailgate of claim 3, further comprising:
   a panel contained in the tailgate and extensible from a second side edge of the tailgate body that is opposed to first side edge; and
   wherein the handle assembly is operative in response to the movement of the handle member to release the panel for extensible movement.

10. The tailgate of claim 9, wherein the panel includes an aperture and the handle assembly includes a pin portion that engages the aperture in the panel, wherein the pin portion is lifted out of engagement with the aperture in response to movement of the handle member.

11. A tailgate for vehicle having a cargo-holding area, comprising:
    a tailgate body adapted for removable mounting to the vehicle;
    at least one coupling member configured to engage the cargo-holding area with the tailgate body extending therefrom to define a downwardly sloping ramp; the coupling member movable between an engagement position and a non-engagement position;
    a mounting mechanism on the tailgate body that is configured to pivotally mount the tailgate body to the vehicle, wherein the mounting mechanism is releasable to permit removal of the tailgate body from the vehicle; and
    a handle assembly including a handle and a linkage connecting the handle to at least one of the mounting mechanism and the coupling member, wherein the linkage is operative in response to the turning of the handle to cause at least one of movement of the coupling member into the engagement position and release of the mounting mechanism.

12. A vehicle, comprising:
    a cargo-holding area;
    a tailgate removably mounted for pivotal movement between a raised position obstructing an entrance to the cargo-holding area, and a lowered position extending rearwardly from the cargo-holding area to provide a rearward extension of cargo-holding area; and
    at least one hook member extensibly position in one side edge of the tailgate and adapted to engage the cargo-holding area with the tailgate extending therefrom to define a downwardly sloping ramp.

13. The vehicle of claim 12, wherein the tailgate further includes a panel extensible from a side edge of the tailgate opposed to the side edge containing the hook member; and a handle assembly positioned in the tailgate comprising a handle member movable between a first position and a second position and a linkage connected between the handle member and the panel; wherein the handle assembly is operative in response to movement of the handle member to release the panel for extensible movement.

14. The vehicle of claim 13, wherein the handle assembly includes a pin portion, the pin portion engaging an aperture in the panel, wherein the pin portion is lifted out of engagement with the aperture in response to movement of the handle member.

15. The vehicle of claim 13, wherein the linkage is connected between the handle member and the hook member, and wherein the handle assembly is operative in response to movement of the handle member to move the hook member to an extended position.

16. The vehicle of claim 12, wherein the tailgate comprises a pivot pin for pivotally mounting the tailgate on the vehicle; and a handle assembly positioned in the tailgate comprising a handle member movable between a first position and a second position and a linkage connected between the handle member and the pivot pin; wherein the linkage is operative in response to movement of the handle member to retract the pivot pin to allow removal of the tailgate from the vehicle.

17. The vehicle of claim 16, wherein the linkage includes a lever having an end pivotal about an axis; the handle member turns about the axis; and the turning movement of the handle member is operative to cause pivotal movement of the lever about the axis, and pivotal movement of the lever is operative to cause extension of the hook member and retraction of the pivot pin.

18. The vehicle of claim 12, further comprising a handle assembly positioned in the tailgate comprising a handle member movable between a first position and a second position and a linkage connected between the handle member and the hook member; wherein the handle assembly is operative in response to movement of the handle member to extend the hook member.

* * * * *